US012625503B2

(12) United States Patent
Yan et al.

(10) Patent No.: US 12,625,503 B2
(45) Date of Patent: May 12, 2026

(54) ROBOT CONTROL METHOD, AND COMPUTER-READABLE STORAGE MEDIUM AND WHEEL-LEGGED BIPED ROBOT USING THE SAME

(71) Applicant: UBTECH ROBOTICS CORP LTD, Shenzhen (CN)

(72) Inventors: Meng Yan, Shenzhen (CN); Jiangchen Zhou, Shenzhen (CN); Chunyu Chen, Shenzhen (CN); Huan Tan, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 27 days.

(21) Appl. No.: 19/006,226

(22) Filed: Dec. 31, 2024

(65) Prior Publication Data

US 2025/0244769 A1    Jul. 31, 2025

(30) Foreign Application Priority Data

Jan. 30, 2024    (CN) .......................... 202410132737.2

(51) Int. Cl.
 *G05D 1/495* (2024.01)
 *B62D 57/028* (2006.01)
 *G05D 109/10* (2024.01)
 *G05D 109/12* (2024.01)

(52) U.S. Cl.
 CPC ........... *G05D 1/495* (2024.01); *B62D 57/028* (2013.01); *G05D 2109/12* (2024.01); *G05D 2109/13* (2024.01)

(58) Field of Classification Search
 CPC .. G05D 1/495; G05D 2109/12; B62D 57/028; B62D 57/032
 See application file for complete search history.

(56) References Cited

U.S. PATENT DOCUMENTS

| | | | | |
|---|---|---|---|---|
| 11,648,681 | B2 * | 5/2023 | Ju | B25J 9/1607 |
| | | | | 700/245 |
| 2005/0021180 | A1 * | 1/2005 | Kwon | A63H 11/00 |
| | | | | 318/568.12 |
| 2009/0108553 | A1 * | 4/2009 | Serai | B62K 11/007 |
| | | | | 280/80.1 |
| 2016/0184721 | A1 * | 6/2016 | Barse | A63H 17/004 |
| | | | | 446/470 |
| 2017/0144299 | A1 * | 5/2017 | Lafaye | G05D 1/0891 |
| 2023/0264356 | A1 * | 8/2023 | Jiang | B25J 9/1679 |
| | | | | 700/245 |

(Continued)

*Primary Examiner* — Long T Tran

(57) ABSTRACT

A robot control method, and a computer-readable storage medium and a wheel-legged biped robot using the same are provided. The method includes: determining a kinetic model of the wheel-legged biped robot; determining, using the kinetic model, a sliding surface of the wheel-legged biped robot; determining, according to the sliding surface, a double power reaching law and a sliding mode control law of the wheel-legged biped robot; and controlling, according to the sliding surface, the double power reaching law and the sliding mode control law, the wheel-legged biped robot. Through the above-mentioned method, the adaptability of the wheel-legged biped robot to uncertain external disturbances can be enhanced, thereby improving its robustness to effectively maintain its balance even in the environment with complex terrain.

20 Claims, 3 Drawing Sheets

(56) References Cited

U.S. PATENT DOCUMENTS

2023/0347501 A1* 11/2023 Wang ...................... B25J 13/088
2024/0181637 A1* 6/2024 Gillett ...................... B25J 17/00
2024/0383138 A1* 11/2024 Hamasaki ................. B25J 5/00

* cited by examiner

ROBOT CONTROL METHOD, AND COMPUTER-READABLE STORAGE MEDIUM AND WHEEL-LEGGED BIPED ROBOT USING THE SAME

CROSS REFERENCE TO RELATED APPLICATIONS

The present disclosure claims priority to Chinese Patent Application No. 202410132737.2, filed Jan. 30, 2024, which is hereby incorporated by reference herein as if set forth in its entirety.

TECHNICAL FIELD

The present disclosure relates to robot technology, and particularly to a robot control method, and a computer-readable storage medium and a wheel-legged biped robot using the same.

BACKGROUND

A wheel-legged biped robot is a robot that moves by connecting two legs to two wheels. As to reducing the probability of tipping over during the movement of the wheel-legged biped robot, balance control of the wheel-legged biped robot is essential.

In the existing method, a proportional integral derivative (PID) controller can generally be used to control the wheel-legged biped robot to maintain its balance. However, due to the nonlinear dynamic characteristics of the wheel-legged biped robot, its control is a complicated problem while easily affected by external interferences, which has poor robustness and is difficult to maintain balance in the environment with complex terrain.

BRIEF DESCRIPTION OF DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

Figure 1:
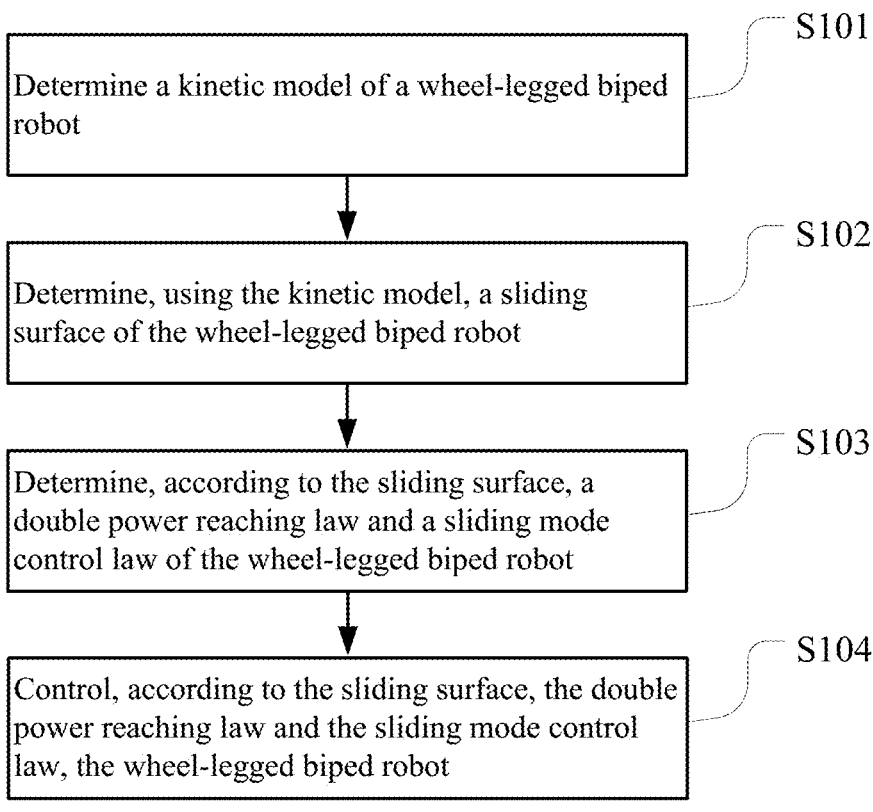
FIG. 1 is a flow chart of a robot control method according to an embodiment of the present disclosure.

In order to make the objects, features and advantages of the present disclosure more obvious and easy to understand, the technical solutions in the embodiments of the present disclosure will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "a," "an," and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the present disclosure, the terms "first", "second", "third", and the like in the descriptions are only used for distinguishing, and cannot be understood as indicating or implying relative importance.

A wheel-legged biped robot is a robot that moves by connecting two legs to two wheels. As to reducing the probability of tipping over during the movement of the wheel-legged biped robot, balance control of the wheel-legged biped robot is essential.

In the existing method, a PID controller can generally be used to control the wheel-legged biped robot to maintain its balance. However, due to the nonlinear dynamic characteristics of the wheel-legged biped robot, its control is a complicated problem while easily affected by external interferences, which has poor robustness and is difficult to maintain balance in the environment with complex terrain.

In the embodiments of the present disclosure, on the basis of a kinetic model of the wheel-legged biped robot, a corresponding sliding surface, double power reaching law, and sliding mode control law are determined, which can enhance the adaptability of the wheel-legged biped robot to uncertain external disturbances, thereby improving its robustness to effectively maintain its balance even in the environment with complex terrain.

In the embodiments of the present disclosure, the main body of execution may be any type of wheel-legged biped robot, and the specific type and structure of the wheel-legged biped robot are not specifically limited herein.

Figures 4, 5:
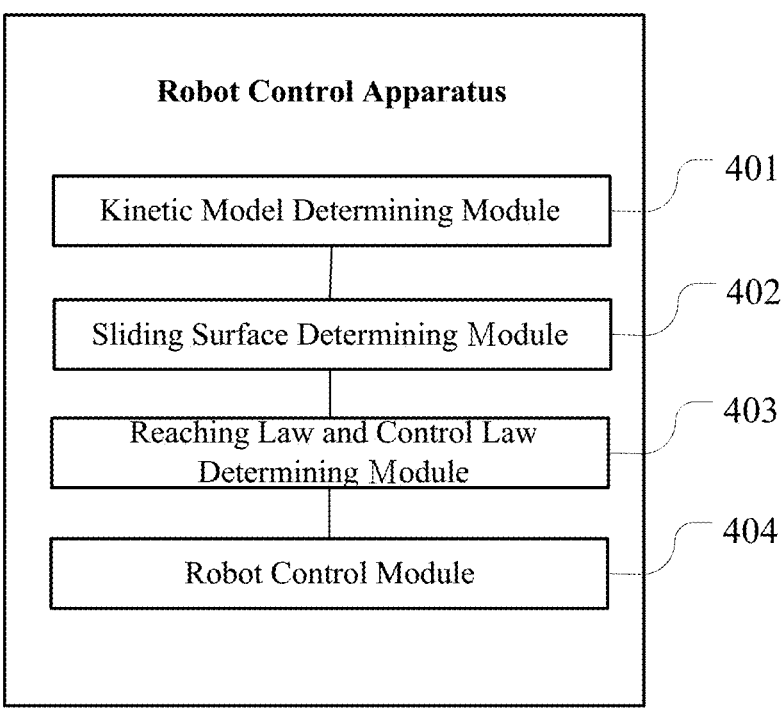
FIG. 4 is a schematic diagram of the structure of a robot control apparatus according to an embodiment of the present disclosure.
FIG. 5 is a schematic diagram of the structure of a robot according to an embodiment of the present disclosure.

FIG. 1 is a flow chart of a robot control method according to an embodiment of the present disclosure. In this embodiment, a method for controlling a wheel-legged biped robot may be applied on (a processor of) a robot control apparatus as shown in FIG. 4. The wheel-legged biped robot may include a body, two legs connected to the body, and two wheels each connected to each of the two legs. In other embodiments, the method may be implemented through a robot as shown in FIG. 5. As shown in FIG. 1, in this embodiment, the robot control method may include the following steps.

S101: determining a kinetic model of the wheel-legged biped robot.

In this embodiment, it may determine parameters of a wheeled inverted pendulum model obtained by simplifying the wheel-legged biped robot; and determine, according to the parameters of the wheeled inverted pendulum mode, the kinetic model of the wheel-legged biped robot.

Figure 2:
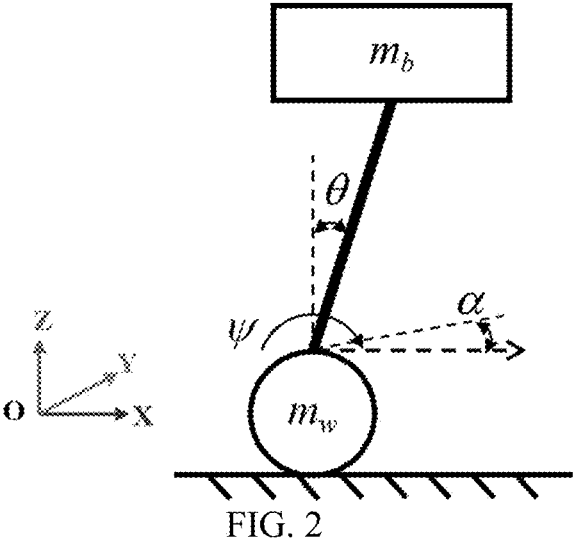
FIG. 2 is a schematic diagram of simplifying a wheel-legged biped robot into a wheeled inverted pendulum model consisting of a body, two legs, and two wheels.

FIG. 2 is a schematic diagram of simplifying the wheel-legged biped robot into the wheeled inverted pendulum model consisting of a body, two legs, and two wheels. As shown in FIG. 2, it may simplify the wheel-legged biped robot into the wheeled inverted pendulum model consisting of the body, the two legs, and the two wheels (i.e., a left wheel and a right wheel). According to the wheeled inverted pendulum model, it may determine, the parameters of the wheeled inverted pendulum model including one or more of a body mass (denoted as $m_b$), a wheel mass (denoted as $m_w$), a wheel radius (denoted as r), a distance between the two wheels (denoted as D), an inverted pendulum height (denoted as l) an inertia of the body around a preset 3D (three-dimensional) coordinate system axis, an inertia of the wheel around the preset 3D coordinate system axis, a forward angle (denoted as $\psi$), a tilt angle (denoted as $\theta$), and a steering angle (denoted as $\alpha$).

In which, the preset 3D coordinate system may be set according to actual needs. For example, it may take a forward direction of the wheel-legged biped robot as the positive direction of the X-axis, take a direction after rotating the forward direction for 90 degrees counterclockwise on the horizontal plane as the positive direction of the Y-axis, and take a direction perpendicular to the horizontal plane upward as the positive direction of the Z-axis. It should be noted that the forgoing setting is only an example, and does not limit the setting of the 3D coordinate system. In specific applications, other forms of 3D coordinate systems may also be set according to actual needs. The inertia of the body around the preset 3D coordinate system axis may include the inertia of the body around the Y axis (denoted as $J_{by}$) and the inertia of the body around the Z axis (denoted as $J_{bz}$), and the inertia of the wheel around the preset 3D coordinate system axis may include the inertia of the wheel around the Y axis (denoted as $J_{wy}$).

By performing force analysis on the two-wheeled leg robot based on the wheeled inverted pendulum model, dynamic equations of the two-wheeled leg robot may be obtained as equations of:

$$
\begin{cases}
m_b lr\ddot{\psi} + (m_b l^2 + J_{by})\ddot{\theta} + m_b gl\theta = -\tau_l - \tau_r & (1) \\
(m_b r^2 + 2m_w r^2 + 2J_{wy})\ddot{\psi} + m_b rl\ddot{\theta} = \tau_l + \tau_r \\
\left(\dfrac{D^2}{2r^2}J_{wy} + \dfrac{D^2}{2r^2}m_w + J_{bz}\right)\ddot{\alpha} = -\dfrac{D}{2r}\tau_l + \dfrac{D}{2r}\tau_r
\end{cases}
$$

where, $\tau_l$ is the torque of the left wheel, $\tau_r$ is the torque of the right wheel, and g is the gravity acceleration.

After sorting the forgoing equations out, it may obtain a mathematical model as an equation of:

$$
M(q)\ddot{q} + N(q, \dot{q}) + O(\dot{q}) = \tau + d_{ext}; \qquad (2)
$$

where, q is a state vector and $q=[q_1\ q_2\ q_3]^T=[\psi\ \theta\ \alpha]^T$; $q_1$ is a first state quantity, that is, the forward angle $\psi$, $q_2$ is a second state quantity, that is, the tilt angle $\theta$; $q_3$ is a third state quantity, that is, the steering angle $\alpha$; M(q) is an inertia matrix; $N(q, \dot{q})$ is a nonlinear term generated by the centrifugal force and the Coriolis force; $O(\dot{q})$ is a gravity term; $\tau$ is a torque vector composed of the torque of the left wheel and that of the right wheel; and $d_{ext}$ is an external interference quantity.

Considering the uncertainty of modeling, the model may be transformed as equations of:

$$
\begin{cases}
\hat{M}(q) = M(q) - \Delta M(q) & (3) \\
\hat{N}(q, \dot{q}) = N(q, \dot{q}) - \Delta N(q, \dot{q}) \\
\hat{O}(\dot{q}) = O(\dot{q}) - \Delta O(\dot{q}) \\
d' = d_{ext} - \Delta M(q)\ddot{q} - \Delta N(q, \dot{q}) - \Delta O(\dot{q})
\end{cases} ;
$$

where, $\Delta$ represents a deviation quantity.

After further sorting the forgoing equations out, it may obtain equations of:

$$
\ddot{q} = A(q, \dot{q}) + BU + d; \text{ and} \qquad (4)
$$

$$
A = \begin{bmatrix} a_1 \\ a_2 \\ a_3 \end{bmatrix}, B = \begin{bmatrix} b_1 & 0 \\ b_2 & 0 \\ 0 & b_3 \end{bmatrix}, U = \begin{bmatrix} u_1 \\ u_2 \end{bmatrix} = \begin{bmatrix} \tau_l + \tau_r \\ -\tau_l + \tau_r \end{bmatrix}, d = \begin{bmatrix} d_1 \\ d_2 \\ d_3 \end{bmatrix};
$$

where, A and B are coefficient matrices, and $a_1$, $a_2$, $a_3$, $b_1$ and $b_2$ are their coefficients; U is a torque control quantity, $u_1$ is a first torque control quantity, and $u_2$ is a second torque control quantity; d is a lumped disturbance quantity; and $d_1$ is a first disturbance quantity; $d_2$ is a second disturbance quantity, and $d_3$ is a third disturbance quantity.

S102: determining, using the kinetic model, a sliding surface of the wheel-legged biped robot.

Since the instructions tracked by the two-wheeled legged robot are mainly as to forward speed and steering speed, based on the kinetic model of the two-wheeled legged robot, it may determine the sliding surface of the wheel-legged biped robot using an equation of:

$$
S = \begin{bmatrix} s_1 \\ s_2 \end{bmatrix} = \dot{e} + \lambda e; \qquad (5)
$$

where, e is a system state error of the wheel-legged biped robot and $e=X-X_d=[e_1\ e_3]^T$, X is an actual system state of the wheel-legged biped robot and $X=[q_1\ q_3]^T$, $q_1$ is an actual forward angle of the wheel-legged biped robot, $q_3$ is an actual steering angle of the wheel-legged biped robot, $X_d$ is a demanded system state of the wheel-legged biped robot and $X_d=[q_{1d}\ q_{3d}]^T$, $q_{1d}$ is a demanded forward angle of the wheel-legged biped robot, $q_{3d}$ is a demanded steering angle of the wheel-legged biped robot, $e_1$ is a forward angle error of the wheel-legged biped robot, and $e_3$ is a steering angle error of the wheel-legged biped robot; S is the sliding surface, $s_1$ is a first component of the sliding surface, and $s_2$ is a second component of the sliding surface; $\lambda$ is a parameter matrix of the sliding surface and $$\lambda = \begin{bmatrix} \lambda_1 & 0 \\ 0 & \lambda_2 \end{bmatrix},$$

$\lambda_1$ is a first parameter of the sliding surface, $\lambda_2$ is a second parameter of the sliding surface, and $\lambda_1>0$, $\lambda_2>0$, and both satisfy the Hurwitz condition; and $\dot{e}$ is an angular velocity error of the wheel-legged biped robot and $\dot{e}=[\dot{e}_1, \dot{e}_3]^T$, $\dot{e}_1$ is a forward angular velocity error of the wheel-legged biped robot, and $\dot{e}_3$ is a steering angular velocity error of the wheel-legged biped robot.

S103: determining, according to the sliding surface, a double power reaching law and a sliding mode control law of the wheel-legged biped robot.

In this embodiment, it is considered that the reaching law commonly used in the existing method has a poor effect on the suppression of chattering which is not conducive to the motor control of the wheel-legged biped robot because it will not only cause a large amount of energy loss but also may make the system of the wheel-legged biped robot unstable to damage the system. In order to further suppress the chattering of the system to improve the accuracy and robustness of the control of the wheel-legged biped robot, and improve the convergence speed, a sliding mode controller for the two-wheeled legged robot may be designed based on the double power reaching law.

In which, the general form of the double power reaching law may be as an equation of:

$$\dot{s} = -\lambda_1|s|^{\delta_2}\operatorname{sgn} s - \lambda_2|s|^{\delta_2}\operatorname{sgn} s \; \lambda_1 > 0, \lambda_2 > 0, 1 > \delta_1 > 0, \delta_2 > 1; \quad (6)$$

where, sgn is a sign function, $\delta_1$ is a first power parameter, and $\delta_2$ is a second power parameter. In the first stage, the system will first approach s(x)=1, the convergence speed at this time is mainly affected by the coefficient $\delta_2$, the approach speed is increased with the increase of $\delta_2$, and the influence of $\delta_2$ in the next stage will weaken accordingly when it is increased; and in the second stage, the system will approach the sliding surface s(x)=0, the convergence speed at this time is mainly affected by the coefficient $\delta_1$, and the approach speed is increased with the decrease of $\delta_1$. The selection rule of $\delta_1$ and $\delta_2$ may be as an equation of:

$$\delta_1 + \delta_2 = 2 \quad (7)$$

When the sliding mode control strategy of the double power reaching law is adopted, the finite convergence time T of the system is finite and has an upper bound of $T_{max}$ if $\delta_1+\delta_2=2$, which will be proved as below.

First, when the double power reaching law is adopt, the sliding mode exists, and:

$$s\dot{s} = -\lambda_1 s|s|^{\delta_1}\operatorname{sgn} s - \lambda_2 s|s|^{\delta_2}\operatorname{sgn} s = -\lambda_1|s|^{\delta_1+1}\operatorname{sgn} s - \lambda_2|s|^{\delta_2+1}\operatorname{sgn} s \le 0 \quad (8)$$

Therefore, the reachability condition can be met.

Second, the convergence time T of the system is calculated in two stages to represent by $T_1$ and $T_2$, respectively. During the system approaches s(x)=1 from s(x)>1, the speed of convergence will be determined by $\delta_2$. At this time, the influence of the former term in the forgoing equation may be ignored, so it may be assumed that:

$$\dot{s} = -\lambda_2|s|^{\delta_2}\operatorname{sgn} s; \quad (9)$$

after integration, it can obtain:

$$s^{1-\delta_2} = \lambda_2(1 - \delta_2)T_1 + s(x(t_0))^{1-\delta_2}; \quad (10)$$

therefore:

$$T_1 = \frac{1 - s(x(t_0))^{1-\delta_2}}{\lambda_2(1 - \delta_2)} \quad (11)$$

When the system approaches the sliding surface s(x)=0, the speed of convergence will be determined by $\delta_1$. At this time, the influence of the latter term in the forgoing equation can be ignored, so it can be given that:

$$\dot{s} = -\lambda_1|s|^{\delta_1}\operatorname{sgn} s; \quad (12)$$

after integration, it can obtain:

$$s^{1-\delta_1} = 1 - \lambda_2(1 - \delta_1)T_2; \quad (13)$$

therefore:

$$T_2 = \frac{1}{\lambda_1(1 - \delta_1)}; \quad (14)$$

Since only the decisive role of the main factors was considered in the previous calculation, the actual convergence time T should be:

$$T < T_1 + T_2 = \frac{1 - s(x(t_0))^{1-\delta_2}}{\lambda_2(1 - \delta_2)} + \frac{1}{\lambda_1(1 - \delta_1)} \quad (15)$$

From the forgoing equation, it can be seen that the convergence time T is finite.

Third, the upper bound $T_{max}$ of the finite convergence time T is solved. Since there are two cases namely $s(x(t_0))>0$ and $s(x(t_0))<0$, the case of $s(x(t_0))>0$ will be discussed while the case of $s(x(t_0))<0$ is similar and will not be discussed. When $\delta_1+\delta_2=2$, the equation may be transformed into:

$$\dot{s} = -\lambda_1 s^{\delta_1} - \lambda_2 s^{2-\delta_1}; \quad (16)$$

multiplying both sides of the equation with $s^{-\delta_1}$, then:

$$\dot{s}s^{-\delta_1} = -\lambda_1 s^0 - \lambda_2 s^{2-2\delta_1}; \quad (17)$$

further, it may be represented as:

$$(1 - \delta_1)\lambda_2\left(s^{1-\delta_1}\right)^2 + \left(s^{1-\delta_1}\right)' + \lambda_1 = 0; \tag{18}$$

the general solution of the equation may be obtained as an equation of:

$$s^{1-\delta_1} = \sqrt{\frac{\lambda_1}{\lambda_2}}\,\tan\left(\arctan\left(\sqrt{\frac{\lambda_2}{\lambda_1}}\,|s(x(t_0))|^{(1-\delta_1)}\right) - \sqrt{\lambda_1\lambda_2}\,(1-\delta_1)t\right); \tag{19}$$

therefore:

$$s = \begin{cases} 0 & t > t_0 \\ \mathrm{sgn}(s(x(t_0)))\left(\sqrt{\frac{\lambda_1}{\lambda_2}}\,\tan\left(\arctan\left(\sqrt{\frac{\lambda_2}{\lambda_1}}\,|s(x(t_0))|^{(1-\delta_1)}\right)\right)\right)^{\frac{1}{1-\delta_1}} & t < t_0 \end{cases}; \tag{20}$$

where $t_0$ in the equation is the convergence time T:

$$T = \frac{\arctan\left(\sqrt{\frac{\lambda_2}{\lambda_1}}\,|s(x(t_0))|^{(1-\delta_1)}\right)}{\sqrt{\lambda_1\lambda_2}\,(1-\delta_1)} \tag{21}$$

Since $$\arctan\left(\sqrt{\frac{\lambda_2}{\lambda_1}}\,|s(x(t_0))|^{(1-\delta_1)}\right) \in \left[0, \frac{\pi}{2}\right),$$

then:

$$T < \frac{\pi}{2\sqrt{\lambda_1\lambda_2}\,(1-\delta_1)} = T_{max} \tag{22}$$

Therefore, the finite convergence time T of the system has the upper bound $T_{max}$, while $T_{max}$ is independent of the initial state $s(x(t_0))$.

As above, it is proved that when the sliding mode control strategy of the double power reaching law is adopted, as long as $\delta_1+\delta_2=2$, the finite convergence time T can be obtained, and there is an upper bound $T_{max}$ that is independent of the initial state. In this embodiment, the double power reaching law may be involved in the complete sliding mode controller of the two-wheeled legged robot. Specifically, it may determine the double power reaching law of the wheel-legged biped robot based on an equation of:

$$\dot{S} = -k_1\begin{bmatrix} |s_1| & 0 \\ 0 & |s_2| \end{bmatrix}^{-\delta_1}\begin{bmatrix} \mathrm{sgn}(s_1) \\ \mathrm{sgn}(s_2) \end{bmatrix} - k_2\begin{bmatrix} |s_1| & 0 \\ 0 & |s_2| \end{bmatrix}^{\delta_2}\begin{bmatrix} \mathrm{sgn}(s_1) \\ \mathrm{sgn}(s_2) \end{bmatrix} \tag{23}$$
$$= -k_1\begin{bmatrix} |s_1|^{\delta_1} & \mathrm{sgn}(s_1) \\ |s_2|^{\delta_1} & \mathrm{sgn}(s_2) \end{bmatrix} - k_2\begin{bmatrix} |s_1|^{\delta_2} & \mathrm{sgn}(s_1) \\ |s_2|^{\delta_2} & \mathrm{sgn}(s_2) \end{bmatrix};$$

where, $k_1$ is a first reaching law parameter, and $k_2$ is a second reaching law parameter.

If disturbances are not considered, the sliding mode control law may be as an equation of:

$$U = \begin{bmatrix} u_1 \\ u_2 \end{bmatrix} = \tag{24}$$
$$\begin{bmatrix} \dfrac{1}{\lambda_3 b_1 + b_2}(-\lambda_3 a_1 - a_2 - \lambda_1\dot{q}_2 - \lambda_2(\dot{q}_1 - \dot{q}_{1d}) - k_1\mathrm{sign}(s_1) - k_1's_1) \\ \dfrac{1}{b_3}(-a_3 - \lambda_4\dot{q}_3 - k_1\mathrm{sign}(s_1) - k_2's_2) \end{bmatrix};$$

wherein, $\lambda_3$ is a third parameter of the sliding surface, and $\lambda_4$ is a fourth parameter of the sliding surface.

S104: controlling, according to the sliding surface, the double power reaching law and the sliding mode control law, the wheel-legged biped robot.

In one embodiment, when the disturbances are not considered, the wheel-legged biped robot may be directly controlled according to the sliding surface, the double power approaching law, and the sliding mode control law.

In another embodiment, when the disturbances are considered, it may determine, according to the kinetic model and the sliding surface, an adaptive law of the wheel-legged biped robot; and control, according to the sliding surface, the double power reaching law, the sliding mode control law and the adaptive law, the wheel-legged biped robot.

Specifically, when the cases that the two-wheeled legged robot has modeling uncertainty and the external interferences are considered, that is $d \neq 0$, an adaptive sliding mode scheme may be used to estimate the upper bound $|d_i|_{max}$ of the time-varying parameter $|d_i|$. Assume that the adaptive parameter $\hat{\alpha}_i$ be the estimated value of $|d_i|_{max}$, the adaptive law is as an equation of:

$$\dot{\hat{\alpha}} = \begin{bmatrix} \dot{\hat{\alpha}}_1 & 0 \\ 0 & \dot{\hat{\alpha}}_2 \end{bmatrix} = \begin{bmatrix} \dfrac{\mu}{\rho_2}s_1\mathrm{sign}(s_1) & 0 \\ 0 & \dfrac{\mu}{\rho_2}s_2\mathrm{sign}(s_2) \end{bmatrix}; \tag{25}$$

where $\mu$, $\rho_1$, and $\rho_2$ are the adaptive law parameters larger than 0.

According to the sliding mode control law and the adaptive law, it may determine an adaptive sliding mode control law of the wheel-legged biped robot as an equation of:

$$U = \begin{bmatrix} u_1 \\ u_2 \end{bmatrix} = \tag{26}$$
$$\begin{bmatrix} \dfrac{1}{\lambda_3 b_1 + b_2}(-\lambda_3 a_1 - a_2 - \lambda_1\dot{q}_2 - \lambda_2(\dot{q}_1 - \dot{q}_{1d}) - \hat{\alpha}_1\mathrm{sign}(s_1) - \hat{\alpha}_2 s_1) \\ \dfrac{1}{b_3}(-a_3 - \lambda_4\dot{q}_3 - \hat{\alpha}_1\mathrm{sign}(s_1) - \hat{\alpha}_2 s_2) \end{bmatrix}$$

Then, it may control, according to the sliding surface, the double power reaching law and the adaptive sliding mode control law, the wheel-legged biped robot.

Figure 3:
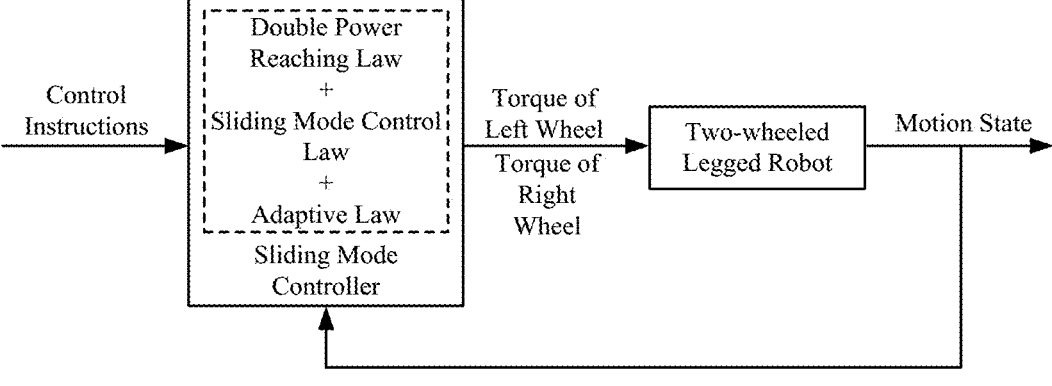
FIG. 3 is a schematic diagram of controlling a wheel-legged biped robot.

FIG. 3 is a schematic diagram of controlling the wheel-legged biped robot. As shown in FIG. 3, the sliding mode controller of the two-wheeled legged robot receives control instructions for forward speed, steering speed, and the like, obtains a motion state of the two-wheeled legged robot under external interferences, and determines the torque of the left wheel of the two-wheeled legged robot and that of the right wheel of the two-wheeled legged robot based on the double power reaching law, the sliding mode control law, and the adaptive law to control the two-wheeled legged robot according to the torques.

The system stability of the sliding mode controller will be proved as below. Assume that the Lyapunov function is as an equation of:

$$V = \frac{1}{2}s^T s + \frac{1}{2\mu}\left(\rho_1 \tilde{\alpha}_1^2 + \rho_2 \tilde{\alpha}_2^2\right) \geq 0; \qquad (27)$$

where, $\tilde{\alpha}_i = \hat{\alpha}_i - \alpha_i^*$, i=1, 2, $\hat{\alpha}_i$ is an estimated value, $\alpha_i^*$ is an actual value, and $\tilde{\alpha}_i$ is an estimation error.

Taking the derivative of the forgoing equation, it can obtain:

$$\dot{V} = s^T \dot{s} = -k_3|s_1||s_1|^{\delta_1} - k_4|s_1||s_1|^{\delta_2} - \qquad (28)$$
$$k_3|s_2||s_2|^{\delta_1} - k_4|s_2||s_2|^{\delta_2} - (\alpha_1^* - |d_1|)|s_1| - (\alpha_2^* - |d_2|)|s_2| \leq 0;$$

where, $k_3$ and $k_4$ are preset coefficients.

Then, the Lyapunov function will be a monotonically decreasing function of time t, so $0 \leq V(t) \leq V(0)$. Because V(0) is bounded, V(t) will be also bounded, and then:

$$V(t) - V(0) = \int_0^t -\left(k_3|s_1|^{\delta_1+1} + \qquad (29)\right.$$
$$k_4|s_1|^{\delta_2+1} + k_4|s_4|^{\delta_4+1} + (\alpha_1^* - |d_1|)|s_1| + (\alpha_2^* - |d_2|)|s_2|\big)d\sigma;$$

$$\int_0^t \left(k_3|s_1|^{\delta_1+1} + k_4|s_1|^{\delta_2+1} + k_3|s_2|^{\delta_1+1} + \qquad (30)\right.$$
$$k_4|s_2|^{\delta_2+1} + (\alpha_1^* - |d_1|)|s_1| - (\alpha_2^* - |d_2|)|s_2|\big)d\sigma \leq V(0) < \infty$$

$$\int_0^t \left(k_3|s_1|^{\delta_1+1} + k_4|s_1|^{\delta_2+1} + k_3|s_2|^{\delta_1+1} + k_4|s_2|^{\delta_2+1}\right)d\sigma \leq V(0) < \infty; \qquad (31)$$

$$\int_0^t \left(k_3|s_1|^2 + k_3|s_2|^2\right)d\sigma < \infty \qquad (32)$$

Therefore, s is bounded, $\dot{V}$ is also bounded, and $s^T \dot{s}$ and $\dot{s}$ are both bounded. The square of s is integrable, and by inferencing based on the Barbalat's lemma, it can obtain:

$$\lim_{t \to \infty} s = 0 \qquad (33)$$

Therefore, the double power reaching law, the sliding mode control law, and the adaptive law make the overall system in the Lyapunov stability. The selected sliding surface s can converge to zero, and the tracking error e can also converge to zero.

In summary, in this embodiment, by determining a kinetic model of the wheel-legged biped robot; determining, using the kinetic model, a sliding surface of the wheel-legged biped robot; determining, according to the sliding surface, a double power reaching law and a sliding mode control law of the wheel-legged biped robot; and controlling, according to the sliding surface, the double power reaching law and the sliding mode control law, the wheel-legged biped robot, the adaptability of the wheel-legged biped robot to uncertain external disturbances can be enhanced, thereby improving its robustness to effectively maintain its balance even in the environment with complex terrain.

It should be understood that, the sequence of the serial number of the steps in the above-mentioned embodiments does not mean the execution order while the execution order of each process should be determined by its function and internal logic, which should not be taken as any limitation to the implementation process of the embodiments.

FIG. 4 is a schematic diagram of the structure of a robot control apparatus according to an embodiment of the present disclosure. In this embodiment, an apparatus for controlling the above-mentioned wheel-legged biped robot may be implemented as the above-mentioned sliding mode controller which may be used in the robot as shown in FIG. 5. As shown in FIG. 4, the robot control apparatus corresponding to the robot control method in the forgoing embodiment is provided. In this embodiment, the robot control apparatus may include:

a kinetic model determining module 401 configured to determine a kinetic model of the wheel-legged biped robot;

a sliding surface determining module 402 configured to determine, using the kinetic model, a sliding surface of the wheel-legged biped robot;

a reaching law and control law determining module 403 configured to determine, according to the sliding surface, a double power reaching law and a sliding mode control law of the wheel-legged biped robot; and a robot control module 404 configured to control, according to the sliding surface, the double power reaching law and the sliding mode control law, the wheel-legged biped robot.

In one embodiment, the robot control module 404 may include:

an adaptive law determining unit configured to determine, according to the kinetic model and the sliding surface, an adaptive law of the wheel-legged biped robot; and an adaptive control unit configured to control, according to the sliding surface, the double power reaching law, the sliding mode control law and the adaptive law, the wheel-legged biped robot.

In one embodiment, the adaptive control unit may be specifically configured to:

determine, according to the sliding mode control law and the adaptive law, an adaptive sliding mode control law of the wheel-legged biped robot; and control, according to the sliding surface, the double power reaching law and the adaptive sliding mode control law, the wheel-legged biped robot.

In one embodiment, the kinetic model determining module 401 may include:

a model parameter determining unit configured to determine parameters of a wheeled inverted pendulum model obtained by simplifying the wheel-legged biped robot; and a kinetic model determining unit configured to determine, according to the parameters of the wheeled inverted pendulum mode, the kinetic model of the wheel-legged biped robot.

In one embodiment, the model parameter determining unit may be specifically configured to:

simplifying the wheel-legged biped robot into the wheeled inverted pendulum model consisting of a body, two legs, and two wheels; and determining, according to the wheeled inverted pendulum model, the parameters of the wheeled inverted pendulum model including one or more of a body mass, a wheel mass, a wheel radius, a distance between the two wheels, an inverted pendulum height, an inertia of the body around a preset 3D coordinate system axis, an inertia of the wheel around the preset 3D coordinate system axis, a forward angle, a tilt angle, and a steering angle.

In one embodiment, the sliding surface determining module 402 may be specifically configured to:

determine the sliding surface of the wheel-legged biped robot based on an equation of:

$$S = \begin{bmatrix} s_1 \\ s_2 \end{bmatrix} = \dot{e} + \lambda e;$$

where, e is a system state error of the wheel-legged biped robot and $e = X - X_d = [e_1 \ e_3]^T$, X is an actual system state of the wheel-legged biped robot and $X = [q_1 \ q_3]^T$, $q_1$ is an actual forward angle of the wheel-legged biped robot, $q_3$ is an actual steering angle of the wheel-legged biped robot, $X_d$ is a demanded system state of the wheel-legged biped robot and $X_d = [q_{1d} \ q_{3d}]^T$, $q_{1d}$ is a demanded forward angle of the wheel-legged biped robot, $q_{3d}$ is a demanded steering angle of the wheel-legged biped robot, $e_1$ is a forward angle error of the wheel-legged biped robot, and $e_3$ is a steering angle error of the wheel-legged biped robot; S is the sliding surface, $s_1$ is a first component of the sliding surface, and $s_2$ is a second component of the sliding surface; $\lambda$ is a parameter matrix of the sliding surface and $$\lambda = \begin{bmatrix} \lambda_1 & 0 \\ 0 & \lambda_2 \end{bmatrix},$$

$\lambda_1$ is a first parameter of the sliding surface, $\lambda_2$ is a second parameter of the sliding surface, and $\lambda_1 > 0$, $\lambda_2 > 0$, and both satisfy the Hurwitz condition; and $\dot{e}$ is an angular velocity error of the wheel-legged biped robot and $\dot{e} = [\dot{e}_1 \ \dot{e}_3]^T$, $\dot{e}_1$ is a forward angular velocity error of the wheel-legged biped robot, and $\dot{e}_3$ is a steering angular velocity error of the wheel-legged biped robot.

In one embodiment, the reaching law and control law determining module 403 may be specifically configured to:

determine the double power reaching law of the wheel-legged biped robot based on an equation of:

$$\dot{S} = -k_1 \begin{bmatrix} |s_1| & 0 \\ 0 & |s_2| \end{bmatrix}^{\delta_1} \begin{bmatrix} \text{sgn}(s_1) \\ \text{sgn}(s_2) \end{bmatrix} - k_2 k_1 \begin{bmatrix} |s_1| & 0 \\ 0 & |s_2| \end{bmatrix}^{\delta_2} \begin{bmatrix} \text{sgn}(s_1) \\ \text{sgn}(s_2) \end{bmatrix} = \qquad \text{i.}$$

$$-k_1 \begin{bmatrix} |s_1|^{\delta_1} & \text{sgn}(s_1) \\ |s_2|^{\delta_1} & \text{sgn}(s_2) \end{bmatrix} - k_2 \begin{bmatrix} |s_1|^{\delta_2} & \text{sgn}(s_1) \\ |s_2|^{\delta_2} & \text{sgn}(s_2) \end{bmatrix};$$

where, sgn is a sign function; $k_1$ is a first reaching law parameter, and $k_2$ is a second reaching law parameter; and $\delta_1$ is a first power parameter, $\delta_2$ is a second power parameter, and $\delta_1 + \delta_2 = 2$.

Those skilled in the art may clearly understand that, for the convenience and simplicity of description, for the specific operation process of the above-mentioned apparatus, module, and units, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

FIG. 5 is a schematic diagram of the structure of a robot according to an embodiment of the present disclosure. The robot may be any type of wheel-legged biped robot, and the specific type and structure of the wheel-legged biped robot are not specifically limited herein. For the convenience of explanation, only the parts related to this embodiment are shown.

As shown in FIG. 5, in this embodiment, the robot 5 includes a processor 50, a storage 51, and a computer program 52 stored in the storage 51 and executable on the processor 50. When executing (instructions in) the computer program 52, the processor 50 implements the steps in the above-mentioned embodiments of the robot control method, for example, steps S101-S104 shown in FIG. 1. Alternatively, when the processor 50 executes the (instructions in) computer program 52, the functions of each module/unit in the above-mentioned device embodiments, for example, the functions of the modules 401-404 shown in FIG. 4 are implemented.

Exemplarily, the computer program 52 may be divided into one or more modules/units, and the one or more modules/units are stored in the storage 51 and executed by the processor 50 to realize the present disclosure. The one or more modules/units may be a series of computer program instruction sections capable of performing a specific function, and the instruction sections are for describing the execution process of the computer program 52 in the robot 5.

It can be understood by those skilled in the art that FIG. 5 is merely an example of the robot 5 and does not constitute a limitation on the robot 5, and may include more or fewer components than those shown in the figure, or a combination of some components or different components. For example, the robot 5 may further include an input/output device, a network access device, a bus, and the like.

The processor 50 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 51 may be an internal storage unit of the robot 5, for example, a hard disk or a memory of the robot 5. The storage 51 may also be an external storage device of the robot 5, for example, a plug-in hard disk, a smart media card (SMC), a secure digital (SD) card, flash card, and the like, which is equipped on the robot 5. Furthermore, the storage 51 may further include both an internal storage unit and an external storage device, of the robot 5. The storage 51 is configured to store the computer program 52 and other programs and data required by the robot 5. The storage 51 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/ robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include any entity or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A method for controlling a wheel-legged biped robot, comprising:

determining a kinetic model of the wheel-legged biped robot;

determining, using the kinetic model, a sliding surface of the wheel-legged biped robot;

determining, according to the sliding surface, a double power reaching law and a sliding mode control law of the wheel-legged biped robot; and controlling, according to the sliding surface, the double power reaching law and the sliding mode control law, the wheel-legged biped robot.

2. The method of claim 1, controlling, according to the sliding surface, the double power reaching law and the sliding mode control law, the wheel-legged biped robot comprises:

determining, according to the kinetic model and the sliding surface, an adaptive law of the wheel-legged biped robot; and controlling, according to the sliding surface, the double power reaching law, the sliding mode control law and the adaptive law, the wheel-legged biped robot.

3. The method of claim 2, controlling, according to the sliding surface, the double power reaching law, the sliding mode control law and the adaptive law, the wheel-legged biped robot comprises:

determining, according to the sliding mode control law and the adaptive law, an adaptive sliding mode control law of the wheel-legged biped robot; and controlling, according to the sliding surface, the double power reaching law and the adaptive sliding mode control law, the wheel-legged biped robot.

4. The method of claim 1, determining the kinetic model of the wheel-legged biped robot comprises:

determining parameters of a wheeled inverted pendulum model obtained by simplifying the wheel-legged biped robot; and determining, according to the parameters of the wheeled inverted pendulum mode, the kinetic model of the wheel-legged biped robot.

5. The method of claim 4, determining the parameters of the wheeled inverted pendulum model obtained by simplifying the wheel-legged biped robot comprises:

simplifying the wheel-legged biped robot into the wheeled inverted pendulum model consisting of a body, two legs, and two wheels; and determining, according to the wheeled inverted pendulum model, the parameters of the wheeled inverted pendulum model including one or more of a body mass, a wheel mass, a wheel radius, a distance between the two wheels, an inverted pendulum height, an inertia of the body around a preset three-dimensional coordinate system axis, an inertia of the wheel around the preset three-dimensional coordinate system axis, a forward angle, a tilt angle, and a steering angle.

6. The method of claim 1, determining, using the kinetic model, the sliding surface of the wheel-legged biped robot comprises:

determining the sliding surface of the wheel-legged biped robot based on an equation of:

$$S = \begin{bmatrix} s_1 \\ s_2 \end{bmatrix} = \dot{e} + \lambda e;$$

where, e is a system state error of the wheel-legged biped robot and $e=X-X_d=[e_1\ e_3]^T$, X is an actual system state of the wheel-legged biped robot and $X=[q_1\ q_3]^T$, $q_1$ is an actual forward angle of the wheel-legged biped robot, $q_3$ is an actual steering angle of the wheel-legged biped robot, $X_d$ is a demanded system state of the wheel-legged biped robot and $X_d=[q_{1d}\ q_{3d}]^T$, $q_{1d}$ is a demanded forward angle of the wheel-legged biped robot, $q_{3d}$ is a demanded steering angle of the wheel-legged biped robot, $e_1$ is a forward angle error of the wheel-legged biped robot, and $e_3$ is a steering angle error of the wheel-legged biped robot; S is the sliding surface, $s_1$ is a first component of the sliding surface, and $s_2$ is a second component of the sliding surface; $\lambda$ is a parameter matrix of the sliding surface and $$\lambda = \begin{bmatrix} \lambda_1 & 0 \\ 0 & \lambda_2 \end{bmatrix},$$

$\lambda_1$ is a first parameter of the sliding surface, and $\lambda_2$ is a second parameter of the sliding surface; and $\dot{e}$ is an angular velocity error of the wheel-legged biped robot and $\dot{e}=[\dot{e}_1\ \dot{e}_3]^T$, $\dot{e}_1$ is a forward angular velocity error of the wheel-legged biped robot, and $\dot{e}_3$ is a steering angular velocity error of the wheel-legged biped robot.

7. The method of claim 6, determining, according to the sliding surface, the double power reaching law and the sliding mode control law of the wheel-legged biped robot comprises:

determining the double power reaching law of the wheel-legged biped robot based on an equation of:

$$\dot{S} = -k_1 \begin{bmatrix} |s_1| & 0 \\ 0 & |s_2| \end{bmatrix}^{\delta_1} \begin{bmatrix} \mathrm{sgn}(s_1) \\ \mathrm{sgn}(s_2) \end{bmatrix} - k_2 \begin{bmatrix} |s_1| & 0 \\ 0 & |s_2| \end{bmatrix}^{\delta_2} \begin{bmatrix} \mathrm{sgn}(s_1) \\ \mathrm{sgn}(s_2) \end{bmatrix} =$$
$$-k_1 \begin{bmatrix} |s_1|^{\delta_1} & \mathrm{sgn}(s_1) \\ |s_2|^{\delta_1} & \mathrm{sgn}(s_2) \end{bmatrix} - k_2 \begin{bmatrix} |s_1|^{\delta_2} & \mathrm{sgn}(s_1) \\ |s_2|^{\delta_2} & \mathrm{sgn}(s_2) \end{bmatrix};$$

where, sgn is a sign function; $k_1$ is a first reaching law parameter, and $k_2$ is a second reaching law parameter; and $\delta_1$ is a first power parameter, $\delta_2$ is a second power parameter, and $\delta_1+\delta_2=2$.

8. A non-transitory computer-readable storage medium for storing one or more computer programs, wherein the one or more computer programs comprise:

instructions for determining a kinetic model of a wheel-legged biped robot;

instructions for determining, using the kinetic model, a sliding surface of the wheel-legged biped robot;

instructions for determining, according to the sliding surface, a double power reaching law and a sliding mode control law of the wheel-legged biped robot; and instructions for controlling, according to the sliding surface, the double power reaching law and the sliding mode control law, the wheel-legged biped robot.

9. The storage medium of claim 8, wherein the instructions for controlling, according to the sliding surface, the double power reaching law and the sliding mode control law, the wheel-legged biped robot comprise:

instructions for determining, according to the kinetic model and the sliding surface, an adaptive law of the wheel-legged biped robot; and instructions for controlling, according to the sliding surface, the double power reaching law, the sliding mode control law and the adaptive law, the wheel-legged biped robot.

10. The storage medium of claim 9, wherein the instructions for controlling, according to the sliding surface, the double power reaching law, the sliding mode control law and the adaptive law, the wheel-legged biped robot comprise:

instructions for determining, according to the sliding mode control law and the adaptive law, an adaptive sliding mode control law of the wheel-legged biped robot; and instructions for controlling, according to the sliding surface, the double power reaching law and the adaptive sliding mode control law, the wheel-legged biped robot.

11. The storage medium of claim 10, wherein the instructions for determining the kinetic model of the wheel-legged biped robot comprise:

instructions for determining parameters of a wheeled inverted pendulum model obtained by simplifying the wheel-legged biped robot; and instructions for determining, according to the parameters of the wheeled inverted pendulum mode, the kinetic model of the wheel-legged biped robot.

12. The storage medium of claim 11, wherein the instructions for determining the parameters of the wheeled inverted pendulum model obtained by simplifying the wheel-legged biped robot comprise:

instructions for simplifying the wheel-legged biped robot into the wheeled inverted pendulum model consisting of a body, two legs, and two wheels; and instructions for determining, according to the wheeled inverted pendulum model, the parameters of the wheeled inverted pendulum model including one or more of a body mass, a wheel mass, a wheel radius, a distance between the two wheels, an inverted pendulum height, an inertia of the body around a preset three-dimensional coordinate system axis, an inertia of the wheel around the preset three-dimensional coordinate system axis, a forward angle, a tilt angle, and a steering angle.

13. The storage medium of claim 8, wherein the instructions for determining, using the kinetic model, the sliding surface of the wheel-legged biped robot comprise:

instructions for determining the sliding surface of the wheel-legged biped robot based on an equation of:

instructions for controlling, according to the sliding sur-
face, the double power reaching law and the adaptive
sliding mode control law, the wheel-legged biped robot.

$$S = \begin{bmatrix} s_1 \\ s_2 \end{bmatrix} = \dot{e} + \lambda e;$$

where, e is a system state error of the wheel-legged biped
robot and e=X–X$_d$=[e$_1$ e$_3$]$^T$, X is an actual system state
of the wheel-legged biped robot and X=[q$_1$ q$_3$]$^T$, q$_1$ is
an actual forward angle of the wheel-legged biped
robot, q$_3$ is an actual steering angle of the wheel-legged
biped robot, X$_d$ is a demanded system state of the
wheel-legged biped robot and X$_d$=[q$_{1d}$ q$_{3d}$]$^T$, q$_{1d}$ is a
demanded forward angle of the wheel-legged biped
robot, q$_{3d}$ is a demanded steering angle of the wheel-
legged biped robot, e$_1$ is a forward angle error of the
wheel-legged biped robot, and e$_3$ is a steering angle
error of the wheel-legged biped robot; S is the sliding
surface, s$_1$ is a first component of the sliding surface,
and s$_2$ is a second component of the sliding surface; λ
is a parameter matrix of the sliding surface and $$\lambda = \begin{bmatrix} \lambda_1 & 0 \\ 0 & \lambda_2 \end{bmatrix},$$

λ$_1$ is a first parameter of the sliding surface, and λ$_2$ is
a second parameter of the sliding surface; and ė is an
angular velocity error of the wheel-legged biped robot
and ė=[ė$_1$ ė$_3$]$^T$, ė$_1$ is a forward angular velocity error of
the wheel-legged biped robot, and ė$_3$ is a steering
angular velocity error of the wheel-legged biped robot.

14. A wheel-legged biped robot, comprising:

a processor;

a memory coupled to the processor; and one or more computer programs stored in the memory and
executable on the processor;

wherein, the one or more computer programs comprise:

instructions for determining a kinetic model of the wheel-
legged biped robot;

instructions for determining, using the kinetic model, a
sliding surface of the wheel-legged biped robot;

instructions for determining, according to the sliding
surface, a double power reaching law and a sliding
mode control law of the wheel-legged biped robot; and instructions for controlling, according to the sliding sur-
face, the double power reaching law and the sliding
mode control law, the wheel-legged biped robot.

15. The robot of claim 14, wherein the instructions for
controlling, according to the sliding surface, the double
power reaching law and the sliding mode control law, the
wheel-legged biped robot comprise:

instructions for determining, according to the kinetic
model and the sliding surface, an adaptive law of the
wheel-legged biped robot; and instructions for controlling, according to the sliding sur-
face, the double power reaching law, the sliding mode
control law and the adaptive law, the wheel-legged
biped robot.

16. The robot of claim 15, wherein the instructions for
controlling, according to the sliding surface, the double
power reaching law, the sliding mode control law and the
adaptive law, the wheel-legged biped robot comprise:

instructions for determining, according to the sliding
mode control law and the adaptive law, an adaptive
sliding mode control law of the wheel-legged biped
robot; and

17. The robot of claim 14, wherein the instructions for
determining the kinetic model of the wheel-legged biped
robot comprise:

instructions for determining parameters of a wheeled
inverted pendulum model obtained by simplifying the
wheel-legged biped robot; and instructions for determining, according to the parameters
of the wheeled inverted pendulum mode, the kinetic
model of the wheel-legged biped robot.

18. The robot of claim 17, wherein the instructions for
determining the parameters of the wheeled inverted pendu-
lum model obtained by simplifying the wheel-legged biped
robot comprise:

instructions for simplifying the wheel-legged biped robot
into the wheeled inverted pendulum model consisting
of a body, two legs, and two wheels; and instructions for determining, according to the wheeled
inverted pendulum model, the parameters of the
wheeled inverted pendulum model including one or
more of a body mass, a wheel mass, a wheel radius, a
distance between the two wheels, an inverted pendulum
height, an inertia of the body around a preset three-
dimensional coordinate system axis, an inertia of the
wheel around the preset three-dimensional coordinate
system axis, a forward angle, a tilt angle, and a steering
angle.

19. The robot of claim 14, wherein the instructions for
determining, using the kinetic model, the sliding surface of
the wheel-legged biped robot comprise:

instructions for determining the sliding surface of the
wheel-legged biped robot based on an equation of:

$$S = \begin{bmatrix} s_1 \\ s_2 \end{bmatrix} = \dot{e} + \lambda e;$$

where, e is a system state error of the wheel-legged biped
robot and e=X–X$_d$=[e$_1$ e$_3$]$^T$, X is an actual system state
of the wheel-legged biped robot and X=[q$_1$ q$_3$]$^T$, q$_1$ is
an actual forward angle of the wheel-legged biped
robot, q$_3$ is an actual steering angle of the wheel-legged
biped robot, X$_d$ is a demanded system state of the
wheel-legged biped robot and X$_d$=[q$_{1d}$ q$_{3d}$]$^T$, q$_{1d}$ is a
demanded forward angle of the wheel-legged biped
robot, q$_{3d}$ is a demanded steering angle of the wheel-
legged biped robot, e$_1$ is a forward angle error of the
wheel-legged biped robot, and e$_3$ is a steering angle
error of the wheel-legged biped robot; S is the sliding
surface, s$_1$ is a first component of the sliding surface,
and s$_2$ is a second component of the sliding surface; λ
is a parameter matrix of the sliding surface and $$\lambda = \begin{bmatrix} \lambda_1 & 0 \\ 0 & \lambda_2 \end{bmatrix},$$

λ$_1$ is a first parameter of the sliding surface, and λ$_2$ is
a second parameter of the sliding surface; and ė is an
angular velocity error of the wheel-legged biped robot
and ė=[ė$_1$ ė$_3$]$^T$, ė$_1$ is a forward angular velocity error of
the wheel-legged biped robot, and ė$_3$ is a steering
angular velocity error of the wheel-legged biped robot.

20. The robot of claim 19, wherein the instructions for determining, according to the sliding surface, the double power reaching law and the sliding mode control law of the wheel-legged biped robot comprise:

instructions for determining the double power reaching law of the wheel-legged biped robot based on an equation of:

$$\dot{S} = -k_1 \begin{bmatrix} |s_1| & 0 \\ 0 & |s_2| \end{bmatrix}^{\delta_1} \begin{bmatrix} \mathrm{sgn}(s_1) \\ \mathrm{sgn}(s_2) \end{bmatrix} - k_2 \begin{bmatrix} |s_1| & 0 \\ 0 & |s_2| \end{bmatrix}^{\delta_2} \begin{bmatrix} \mathrm{sgn}(s_1) \\ \mathrm{sgn}(s_2) \end{bmatrix} =$$

$$-k_1 \begin{bmatrix} |s_1|^{\delta_1} & \mathrm{sgn}(s_1) \\ |s_2|^{\delta_1} & \mathrm{sgn}(s_2) \end{bmatrix} - k_2 \begin{bmatrix} |s_1|^{\delta_2} & \mathrm{sgn}(s_1) \\ |s_2|^{\delta_2} & \mathrm{sgn}(s_2) \end{bmatrix};$$

where, sgn is a sign function: $k_1$ is a first reaching law parameter, and $k_2$ is a second reaching law parameter; and $\delta_1$ is a first power parameter, $\delta_2$ is a second power parameter, and $\delta_1 + \delta_2 = 2$.

* * * * *